(12) United States Patent
Jaggi et al.

(10) Patent No.: US 11,155,340 B2
(45) Date of Patent: Oct. 26, 2021

(54) DATA COHERENCY ALGORITHM TO ACHIEVE BIT-FOR-BIT TRANSMISSION

(71) Applicant: BAE Systems Controls Inc., Endicott, NY (US)

(72) Inventors: Gurjeet Jaggi, East Windsor, NJ (US); Christopher M. Blain, Binghamton, NY (US); Gary P. Ellsworth, Endicott, NY (US); Matthew J. Pomes, Apalachin, NY (US)

(73) Assignee: BAE Systems Controls Inc., Endicott, NY (US)

( * ) Notice: Subject to any disclaimer, the term of this patent is extended or adjusted under 35 U.S.C. 154(b) by 206 days.

(21) Appl. No.: 16/730,121

(22) Filed: Dec. 30, 2019

(65) Prior Publication Data

US 2021/0197960 A1 Jul. 1, 2021

(51) Int. Cl.
| | |
|---|---|
| *G05D 1/00* | (2006.01) |
| *B64C 13/50* | (2006.01) |
| *B64D 45/00* | (2006.01) |
| *B64C 13/16* | (2006.01) |

(52) U.S. Cl.
CPC .......... *B64C 13/503* (2013.01); *B64C 13/16* (2013.01); *B64D 45/00* (2013.01); *G05D 1/0022* (2013.01)

(58) Field of Classification Search
CPC ............... G06K 7/084; G06K 9/00228; G06K 9/00255; G06K 9/00268; G06K 9/00295; G06K 9/00335; G06K 9/00362; G06K 9/00744; G06K 9/00778; G06K 9/6201; G06K 9/6218; G06K 9/72; G06F 3/048; G06F 3/04842; G06F 16/447; G06F 3/0481; G06F 3/0482; G06F 3/04845; G06F 3/04847; G06F 3/0485; G06F 3/04855; G06F 3/0488; G06F 3/04883; G06F 3/167; G06F 11/324; G06F 11/3409; G06F 16/45; G06F 17/00; G06F 17/18; G06F 3/0484; G06F 3/153; G06F 30/00; G06F 30/20; G05B 15/02; G05B 13/048; G05B 17/02; G05B 19/048; G05B 19/05; G05B 2219/45129; G05B 23/0243; B64C 13/503; B64C 13/16; B64D 45/00; G05D 1/0022

See application file for complete search history.

(56) References Cited

U.S. PATENT DOCUMENTS

| | | | |
|---|---|---|---|
| 10,957,171 B2* | 3/2021 | Heitz, III | G08B 13/19606 |
| 2017/0373567 A1* | 12/2017 | Nishizono | H05K 7/1432 |

* cited by examiner

*Primary Examiner* — Ian Jen
(74) *Attorney, Agent, or Firm* — Scully Scott Murphy & Presser PC (57) ABSTRACT

Methods and systems for operating actuator control electronics are described. In an example, a system can include a first lane and a second lane configured to be in communication with each other. The first lane can receive first data associated with a first pattern and send the first pattern to the second lane. The second lane can receive second data associated with a second pattern and send the second pattern to the first lane. The first and second lanes can each compare the first pattern with the second pattern. Based on the comparison, the first lane can select first input data and the second lane can select second input data. The first lane can generate a first actuator command using the first input data. The second lane can generate a second actuator command using the second input data. The first and second actuator commands can be bit-for-bit identical.

20 Claims, 7 Drawing Sheets

| Example | Comparison Result | Local (LC) Lane | Transmitting (TX) Lane |
|---|---|---|---|
| E | $T_{LC} = T_{TX}$ and $V_{LC} = V_{TX}$ | Use all $V_{LC}$ | Use all $V_{TX}$ |
| F | $T_{LC} > T_{TX}$ and $T_{TX} = V_{TX}$ | Use common data between $V_{LC}$ and $V_{TX}$<br>Hold uncommon data between $T_{LC}$ and $T_{TX}$ | Use all $V_{TX}$ |
| G | $T_{LC} = T_{TX}$ and $T_{TX} > V_{TX}$ | Use common data between $V_{LC}$ and $V_{TX}$<br>Discard uncommon data between $V_{LC}$ and $V_{TX}$ | Use all $V_{TX}$ |
| H | $T_{LC} > T_{TX}$ and $T_{TX} > V_{TX}$ | Use common data between $V_{LC}$ and $V_{TX}$<br>Discard uncommon data between $V_{LC}$ and $V_{TX}$<br>Hold uncommon data between $T_{LC}$ and $T_{TX}$ | Use common data between $V_{LC}$ and $V_{TX}$ |

DATA COHERENCY ALGORITHM TO ACHIEVE BIT-FOR-BIT TRANSMISSION

BACKGROUND

The present disclosure relates in general to flight control systems and architectures, and more specifically, to data transmission systems related to actuator control electronics.

In a fly-by-wire (FBW) system of an aircraft, actuators of the aircraft may be controlled through remote electronic units (REUs). The REUs may convert control inputs for the actuators into electronic signals that may be used to control the actuators. Actuator Control Electronics (ACE) may receive the electrical signals from the REUs and control the actuators of a flight control surface of the aircraft, such as wing surface actuators including ailerons, flaperons, high lift, and folding wingtip, or tail surfaces such as elevators, rudder, and stabilizer, etc, using the electrical signals. The REUs are configured to communicate with other electronic boxes, such as Actuator Control Electronics (ACE) or Flight Control Computers (FCC). Thus, the integrity of the electronic signals generated and outputted by the REUs and ACEs and the digital/serial interface between the REUs and the other electronic devices must be high in order to maintain safety of the aircraft.

SUMMARY

In some examples, a system for operating actuator control electronics are generally described. The system can include a first lane and a second lane configured to be in communication with the first lane. The first lane can be operable to receive first data associated with a first pattern. The first lane can be further operable to receive, from the second lane, a second pattern associated with second data received at the second lane. The first lane can be further operable to compare the first pattern with the second pattern. The first lane can be further operable to select, based on the comparison, first input data from a plurality of input data received by the first lane. The first lane can be further operable to generate a first actuator command using the selected first input data. The second lane can be operable to receive the second data. The second lane can be further operable to receive the first pattern from the first lane. The second lane can be further operable to compare the first pattern with the second pattern. The second lane can be further operable to select, based on the comparison, second input data from a plurality of input data received by the second lane. The second lane can be further operable to generate a second actuator command using the selected second input data, where the first actuator command and the second actuator command can be bit-for-bit identical.

In some examples, a method implemented by an actuator control electronics (ACE) device comprising a first lane and a second lane is generally described. The method can include receiving, by the first lane, first data associated with a first pattern. The method can further include receiving, by the second lane, second data associated with a second pattern. The method can further include receiving, by the first lane, the second pattern from the second lane. The method can further include receiving, by the second lane, the first pattern from the first lane. The method can further include comparing, by the first lane, the first pattern with the second pattern. The method can further include comparing, by the second lane, the first pattern with the second pattern. The method can further include, based on a result of the comparing, selecting, by the first lane, first input data from a plurality of input data received by the first lane. The method can further include generating, by the first lane, a first actuator command using the selected first input data. The method can further include, based on a result of the comparing, selecting, by the second lane, second input data from a plurality of input data received by the second lane. The method can further include generating, by the second lane, a second actuator command using the selected second input data, where the first actuator command and the second actuator command can be bit-for-bit identical.

In some examples, a flight control system is generally described. The flight control system can include a processor configured to receive input data, an actuator control electronics (ACE) device configured to be in communication with the processor, a remote electronic unit (REU) configured to be in communication with the ACE device, and an actuator configured to be in communication with the REU. The ACE device can include a first lane and a second lane. The first lane of the ACE device can be operable to receive, from the processor, first data associated with a first pattern, where the first data can be a first copy of the input data. The first lane of the ACE device can be further operable to receive, from the second lane, a second pattern associated with second data received at the second lane. The first lane of the ACE device can be further operable to compare the first pattern with the second pattern. The first lane of the ACE device can be further operable to select, based on the comparison, first input data from a plurality of input data received by the first lane. The first lane of the ACE device can be further operable to generate a first actuator command using the selected first input data. The first lane of the ACE device can be further operable to send the first actuator command to the REU. The second lane of the ACE device can be operable to receive, from the processor, the second data, where the second data can be a second copy of the input data. The second lane of the ACE device can be further operable to receive the first pattern from the first lane. The second lane of the ACE device can be further operable to compare the first pattern with the second pattern. The second lane of the ACE device can be further operable to select, based on the comparison, second input data from a plurality of input data received by the second lane. The second lane of the ACE device can be further operable to generate a second actuator command using the selected second input data, where the first actuator command and the second actuator command can be bit-for-bit identical. The second lane of the ACE device can be further operable to send the second actuator command to the REU. The REU can be operable to control the actuator using one of the first actuator command and the second actuator command.

Further features as well as the structure and operation of various embodiments are described in detail below with reference to the accompanying drawings. In the drawings, like reference numbers indicate identical or functionally similar elements.

DETAILED DESCRIPTION

In a flight control system, control data for line replaceable units (LRUs) can be generated by a command (COM) lane, which can be a processing module of a REU. The integrity of the control data generated by the command lane is typically required to be less than 1E-7 (or $10^{-7}$) failures per hour (FPH). The integrity of the control data generated by the command lane is generally verified to ensure that the output control data is not erroneous due to internal error(s), and in order to meet the integrity requirement. A monitor (MON) lane, such as a monitoring processing module, can be used to monitor the control data generated by the command lane to ensure the integrity of the control data. For example, the monitor lane can receive a control input being received by the command lane, and can generate another piece of control data using the control input. An integrity of the control data generated by the command lane can be based on a difference between the control data generated by the command lane and the monitor lane. In some examples, in case of a failure of the command lane, the control data generated by the monitor lane can be used to control the actuator. In some examples, the monitor lane may include dissimilar hardware from the command lane to mitigate generic errors between the command lane and the monitor lane. The dissimilar hardware between the command lane and the monitor lane can cause the control data generated by the lanes to be different, and can interfere with the assurance of integrity of the outputs from the command lane.

In an example, the architecture of command/monitor (COM/MON) lanes may be used in Actuator Control Electronics (ACE) to control an actuator. In order to achieve a satisfying data integrity and to accurately determine the data integrity of the outputs from the command lane, the comparison of the outputs from the command lane and the monitor lane can be based on a bit-for-bit approach. In some examples, using the bit-for-bit approach in the comparison can avoid performing oscillatory analysis to validate the outputs from the command lane. Achieving bit-for-bit identical outputs from the command and monitor lanes requires that both command and monitor lanes use or process identical input data. Given that the command and monitor lanes have dissimilar hardware, two independent clock devices can be used to drive the command and monitor lanes independently, and each clock device can have associated independent hardware tolerance, causing the two lanes to run asynchronous to each other. Due to running asynchronously to each other, the command and monitor lanes can sometimes use or process different input data (e.g., the two input data for the two lanes can be out of phase) and thus generating different output data. In some examples, both command and monitor lanes can implement time dependent functions within the control laws such as integrators and derivatives which eventually will start to diverge and can also cause the two lanes to produce outputs that may not be bit-for-bit identical.

The methods and systems described in accordance with the present disclosure can implement a data coherency algorithm and techniques that allows both lanes to use the same input data, and a lane synchronization algorithm that allows both lanes to execute their internal processing tasks at the same time.

Figure 1:
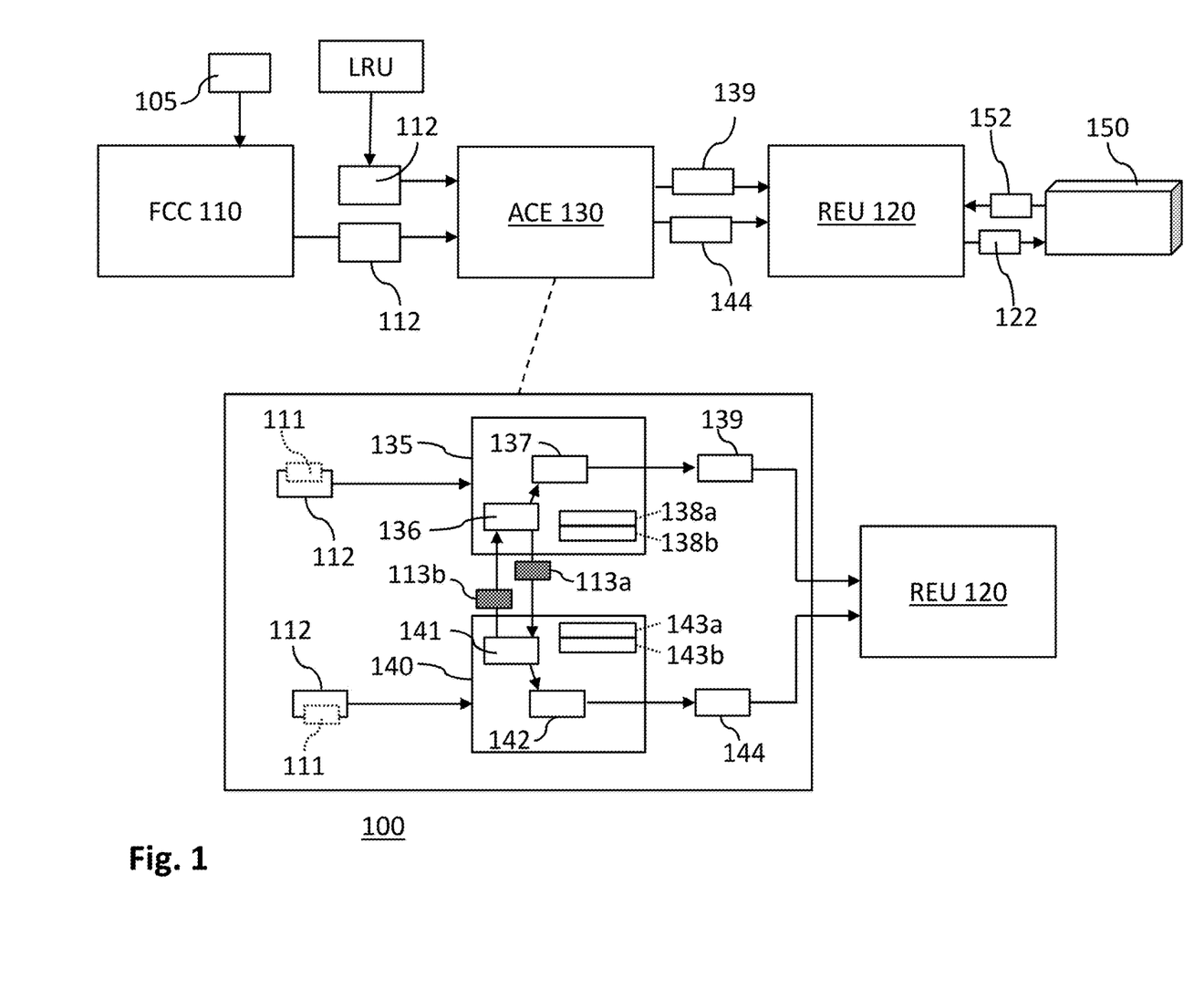
FIG. 1 is a diagram showing an example computer system that can implement data-coherency algorithm to achieve bit-for-bit transmission in one embodiment.

FIG. 1 is a diagram showing an example computer system 100 that can implement data-coherency algorithm to achieve bit-for-bit transmission in one embodiment. The system 100 can include a flight control computer (FCC) 110, a remote electronic unit (REU) 120, an actuator control electronics (ACE) device 130, and/or an actuator 150. The flight control computer 110 can be a processor connected to one or more controls 105 of, for example, a vehicle, a machine, an aircraft, etc. Some examples of these controls can include joysticks, levers, pedals (e.g., rudder pedals), rudders, motion sensors, etc. In an example, the controls can be operable to control one or more the actuators of a flight control surface of the aircraft, such as wing surface actuators including ailerons, flaperons, high lift, and folding wingtip fold, or tail surfaces such as elevators, rudder, and stabilizer. The flight control computer 110 can detect movement or control inputs from the controls 105 and send the detected control inputs as input data 112 to the ACE device 130. For example, the input data 112 can include values representing an amount of pressure that was applied on a rudder pedal. The ACE device 130 can be operable to generate and output actuator commands, which can be signals 139 and 144, based on the input data 112. The ACE device 130 can send the signals 139 and 144 to the REU 120. The REU 120 can be operable to use the signal 139 or 144 to control the actuator 150 depending on a status of the system 100. For example, the signal 139 may be a primary actuator command and the signal 144 can be a backup actuator command that can be used by the REU 120 in place of the signal 139 in response to the signal 139 being deemed as invalid. The REU 120 can output either the signal 139 or the signal 144 as control data 122 (that may include electrical signals) to control the actuator 150.

The input data 112 can be an analog input, a discrete input, an input of the ARINC 429 data type, etc. The ACE device 130 can include a plurality of interfaces, such as digital bus interfaces (e.g., intermodule bus interface (IMB), actuator data bus (ADB) interface), interfaces configured to demodulate and/or excite transducers (LVDT, RVDT, resolvers), and also digital interfaces with line replacement units (LRU) that follow ARINC 429 protocol. The ACE device 130 can, for example, receive input data 112 from the FCC 110 via serial data bus interfaces such as intermodule bus interface (IMB) and Actuator Data Bus (ADB). The ACE device 130 can also, for example, receive input data 112 from a LRU via the ARINC 429 interface. In some examples, the ACE 130 can include analog-to-digital (A/D) converter to convert input data 112 that are analog inputs into digital signals. In some examples, if the input data 112 is a discrete input, the input data can be a data packet including one or more groups of bits such as header, payload, parity, and/or other groups of bits defining attributes of the data packet. The ACE device 130 can validate the input data 112 (e.g., parity check and check for protocol errors) using the COM/MON lane architecture. The validated input data 112 can be outputted as signals 139 and 144 that can be used by the REU 130 to control the actuator 150. In an example, movement and sensor data (represented as signals 152) of the actuator 150 can be feed back to the REU 120 and the REU 120 can perform feedback control based on the actuation signals 152 to stabilize the operation of the actuator 150. By using the REU 120 to perform feedback control, an amount of processing performed by the system 100 can be reduced since the signals 152 may not need to be transmitted back to the FCC 110 to perform feedback control. As used herein, aircraft refers to any air-borne item such as fixed wing aircraft, rotary wing aircraft, unmanned aerial vehicles, and precision guided munitions.

In some examples, the signals 139 and 144 can be generated and outputted by a command (COM) lane 135 and a monitor (MON) lane 140, respectively, of the ACE device 130. The command lane 135 can be a processing module including processing elements such as microprocessors, microcontrollers, field programmable gate array (FPGA) modules, etc. The monitor lane 140 can be a processing module including processing elements such as microprocessors, microcontrollers, field programmable gate array (FPGA) modules, etc. In some example embodiments, a multi-core processor can be used to implement the command lane 135 and the monitor lane 140, such as by using a first processor core to perform the operations of the command lane 135 and using a second processor core to perform the operations of the monitor lane 140. The command lane 135 and the monitor lane 140 can include different hardware and can be operated asynchronously due to having different clock hardware. For example, the command lane 135 and the monitor lane 140 can each have independent clocks that are asynchronous to each other, causing a presence of a relative phase difference between the execution frames of the command lane 135 and monitor lane 140.

The command lane 135 and monitor lane 140 can include a cross lane data link (CLDL) module 136 and a CLDL module 141, respectively. The CLDL modules 136 and 141 are operable to transmit data to the other lane, to facilitate exchange of data between the command lane 135 and monitor lane 140. The CLDL module 136 of the command lane 135 can transmit an activity pattern 113a to the monitor lane 140, and the monitor lane 140 can transmit an activity pattern 113b to the command lane 135. In an embodiment, where time stamp 111 is appended to the input data 112, the activity patterns 113a and 113b can both be the time stamp 111. For such embodiment, since the command lane 135 and the monitor lane 140 include dissimilar components, the exchange of the time stamp 111 between the two lanes may lag each other. For example, the time stamp 111 can be received at the command lane 135 and the monitor lane 140 at the same time—but the CLDL module 136 may transmit the time stamp 111 to the CLDL module 141 at an earlier time than the transmission time of the time stamp 111 by the CLDL module 141 to the CLDL module 136.

In examples where the input data 112 is data being received from the FCC 110 via serial data bus (e.g., IMB and ADB), prior to transmitting the input data 112 to the ACE device 130, the FCC 110 can append a time stamp 111, on the input data 112. The time stamp 111 can be, for example, a value of a transmission time of the input data 112 from the FCC 110. The command lane 135 and the monitor lane 140 can both receive the input data 112, along with appended time stamp 111. Since the command lane 135 and the monitor lane 140 include dissimilar components, the exchange of the time stamp 111 between the two lanes may lag each other. For example, the time stamp 111 can be received at the command lane 135 and the monitor lane 140 at the same time—but the CLDL module 136 may transmit the time stamp 111 to the CLDL module 141 at an earlier time than the transmission time of the time stamp 111 by the CLDL module 141 to the CLDL module 136.

In examples where the input data 112 is data being received from LRUs via the ARINC 429 interface, the command lane 135 and the monitor lane 140 can each count or track a respective number of messages (or labels, or bits) among the input data 112 being received from the LRUs to the ACE 130. In this embodiment, the activity pattern 113a can be a number of messages being received at the command lane 135, via the ARINC 429 interface, and the activity pattern 113b can be a number of messages being received at the monitor lane 140, via the ARINC 429 interface. Since the command lane 135 and the monitor lane 140 include dissimilar, or different, hardware components (or components that functions at different rates, speeds, etc.), the exchange of the activity patterns 113a, 113b between the two lanes may include the same or different number of messages. For example, the activity pattern 113a can indicate a first number of messages being received at the command lane 135 and the activity pattern 113b can indicate a second number of messages being received at the monitor lane 140.

The command lane 135 and the monitor lane 140 can include a coherency module 137 and 142, respectively. The coherency module 137 of the command lane 135 can be operable to compare the activity pattern 113a associated with the command lane 135 with the activity pattern 113b associated with, and received from, the monitor lane 140 (or the CLDL module 141). The coherency module 137, based on the comparison, can select at least a portion of input data 112 to be used by the command lane 135 to generate the actuator command (or signal) 139. Similarly, the coherency module 142 of the monitor lane 140 can be operable to compare the activity pattern 113b associated with the monitor lane 140 with the activity pattern 113a associated with, and received from, the command lane 135 (or the CLDL module 136). The coherency module 142, based on the comparison, can select at least a portion of the input data 112 to be used by the monitor lane 140 to generate the actuator command (or signal) 144. In some examples, the coherency modules 137 and 142 can include comparator circuits operable to perform the comparisons. The selection made by the coherency module 137 and the coherency module 142 can be the same, such that the signals 139 and 144 can be bit-for-bit identical. The command lane 135 and the monitor lane 140 can send the signals 139 and 144, respectively, to the REU 120. The REU 120 can select either the signal 139 or 144, and used the selected signal as the control data 122 to control the actuator 150.

In an example embodiment, the command lane 135 can include two buffers 138a, 138b operable to store the two most recent input data received at the command lane 135. For example, the buffer 138a can store input data 112 that was transmitted from the FCC 110 to the ACE 130 at a time frame N−1, and the buffer 138b can store input data 112 that was transmitted from the FCC 110 to the ACE 130 at a time frame N−2. The CLDL module 136 can be operable to transmit the activity pattern 113a of a most recent copy of input data 112 to the CLDL module 141 of the monitor lane 140. Similarly, the monitor lane 140 can include two buffers 143a, 143b operable to store the input data 112 that was transmitted from the FCC 110 to the ACE 130 at a time frame N−1, and the buffer 143a can store the input data 112 that was transmitted from the FCC 110 to the ACE 130 at a time frame N−2. The selection being made by the coherency modules 137, 142 based on the comparison of activity patterns (as described above) can be made from the input data 112 being stored in these buffers.

In some examples, the ACE device 130 can include a normal mode path and a direct mode path, where each one of the normal mode path and the direct mode path can include a respective pair of command lane and monitor lane. The normal mode path is associated with a normal operation mode of the system 100, and the direct mode path is associated with a direct operation mode of the system 100. The normal mode can be a default operation mode and can utilize ACEs (e.g., ACE module 130) to provide augmented control commands to actuators (e.g., actuator 150). The direct mode can be an operation mode in which actuators (e.g., actuator 150) commanded and controlled by directly commands, such as inputs from the controls 105. The command lane 135 and monitor lane 136 can be lanes of either the normal mode path or the direct mode path of the ACE module 130. A command lane of a normal mode path can be operable to generate actuator commands (e.g., 139) based on data (e.g., input data 112) received from the FCC 110 via an intermodule bus (IMB), and transmit the generated actuator commands to the REU 120 via an actuator data bus (ADB). It is also responsible for transmitting back the actuator feedback (e.g., 152) received from the REU 120 via ADB encapsulated within IMB over to FCC 110. A monitor lane of a normal mode path can be operable to mitigate generic errors between the command and monitor lanes. For example, the monitor lane can independently calculate the same outputs as the command lane and compare the two outputs with wrapped data associated with the command lane outputs (e.g., 139) on both IMB and ADB interfaces.

Figure 2:
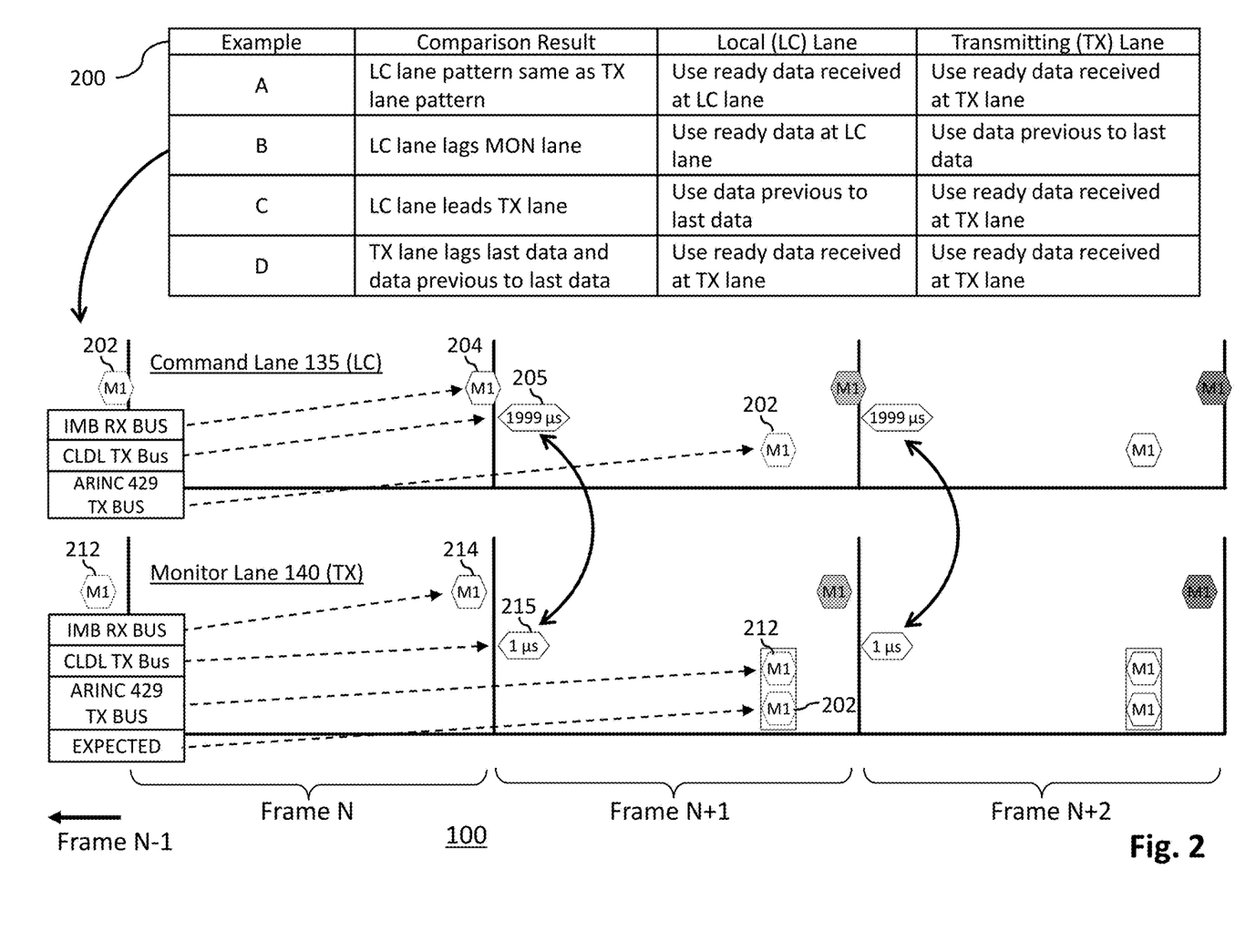
FIG. 2 illustrates an example implementation of the example system 100 of FIG. 1 relating to data-coherency algorithm to achieve bit-for-bit transmission, in one embodiment.

FIG. 2 illustrates an example implementation of the example system 100 of FIG. 1 relating to data-coherency algorithm to achieve bit-for-bit transmission, in one embodiment. FIG. 2 may include components that are labeled identically to components of FIG. 1, which are not described again for the purposes of clarity. The description of FIG. 2 may reference at least some of the components of FIG. 1.

The coherency module 137 of the command lane 135, and the coherency module 142 of the monitor lane 140, can each be operable to compare its own activity pattern with the activity pattern received from the other lane, and can individually select particular input data, where the selections made from the two lanes can be identical input data. In an example, a table 200 in FIG. 2 shows various comparison results and the selections made by a lane in response to different comparison results. The table 200 represents selections by a local (LC) lane and a transmitting (TX) lane, where the local lane represents a local or self perspective of one of the command lane 135 and the monitor lane 140. For example, when the command lane 135 is the local lane, the monitor lane 140 is the transmitting lane, and when the monitor lane 140 is the local lane, the command lane 135 is the transmitting lane. Note that the table 200 illustrates comparisons of activity patterns representing timestamps, appended by the FCC 110, indicating transmission times of corresponding input data from the FCC 110.

Focusing on example A shown in the table 200, a comparison between timestamps (or activity pattern) received by the local and transmitting lanes indicates that the activity patterns of the both copies of control data are the same. Thus, the coherency modules (e.g., 137, 142 in FIG. 1) of the two lanes can select the same portion of the input data 112 to be used in generation of the signals 139 and 144 shown in FIG. 1. By using the same selected portions of the input data 112, the outputs 139 and 144 can be generated using bit-for-bit identical input data. Thus, the outputs 139, 144 can be bit-for-bit identical and the integrity of the resulting control data 122 can be maintained at a satisfactory level. For example, if the activity pattern indicates a transmitting time $t_1$, and if both the local and transmitting lanes transmits $t_1$, each of the lanes can compare its own activity pattern $t_1$ with the $t_1$ received from the other lane, which results in a comparison result indicated by example A. The coherency modules 137 and 142 can determine that, based on this comparison result, the input data appended with $t_1$ can be selected and used for generation of the signals 139 and 144, respectively.

In an example embodiment, the command lane 135 and the monitor lane 140 can receive data and/or messages (e.g., input data 112), process the received data, and output the processed data (e.g., outputs 139, 144), at each processing frame among processing frames N−1, N, N+1, N+2, . . . , where frame N may denote a current processing frame. The command lane 135 and the monitor lane 140 can be operable to perform a sequence of tasks within each processing frame. The sequence of tasks to be performed by each lane may be scheduled by a scheduler (not shown) of the system 100. A duration of the processing frames may be defined by a scheduler (not shown) of the system 100. In an example embodiment, a duration of one frame can be two milliseconds (2 ms). Each processing frame can include a number of subframes, and some tasks may span more than one subframe within the processing frame. For example, if a processing frame is 2 ms and includes sixteen (16) subframes, then each subframe may be of a duration of 125 microseconds (μs).

Focusing on example B of the table 200, assuming the command lane 135 is the local lane and the monitor lane 140 is the transmitting lane, a piece of input data 202 can be received by the local lane at frame N−1 and input data 212 can be received by the monitor lane 140 at frame N−1. The command lane 135 can store the input data 202 in a buffer (e.g., buffer 138a) of command lane 135, and the monitor lane 140 can store the input data 212 in a buffer (e.g., buffer 143a) of monitor lane 140. The operations of the command lane 135 and the monitor lane 140 can proceed from frame N−1 to frame N. During frame N, another piece of input data 204 can be received by the command lane 135, and another piece of input data 214 can be received by the monitor lane 140. The command lane 135 can store the input data 204 in another buffer (e.g., buffer 138b) of command lane 135, and the monitor lane 140 can store the input data 214 in another buffer (e.g., buffer 143b) of monitor lane 140. Note that the input data 204 was not completely received by the command lane 135 during the transition from frame N to frame N+1 (e.g., the input data 204 overlaps with the line separating the two frames). Thus, at the beginning of frame N+1, the input data 204 may be deemed as not ready or unavailable, while the input data 202 received at frame N−1 remains as a ready message or data. Similarly, input data 212 and 214 received by the monitor lane 140 are both ready when frame N+1 begins. The operations of the command lane 135 and the monitor lane 140 can proceed from frame N to frame N+1.

During frame N+1, the CLDL modules (e.g., CLDL modules 136, 141 in FIG. 1) of the command lane 135 and the monitor lane 140 can exchange patterns 205 and 215. The pattern 205 shown in FIG. 2 can represent a time stamp indicating, for example, a transmission time of the input data 204 from the FCC 110. In the example shown in FIG. 2, the activity pattern 205 indicates "1999 µs", which can indicate that the input data 204 was transmitted from the FCC at the 1999-µs mark in a 2-ms frame. Similarly, the pattern 215 shown in FIG. 2 can represent a transmission time of the input data 214, such as, for example, the 1-µs mark in a 2-ms frame. A comparison of the pattern 205 and 215 performed by the coherency modules 137, 142 can indicate that the command lane 135 lags the monitor lane 140. This lag can indicate, for example, the monitor lane 140 can be operating at a faster rate than the command lane 135, or the command lane 135 experienced an event (e.g., failure) at some point before receiving the pattern 205. Also, the difference between the patterns 205 and 215 can indicate a likelihood that the most recent ready (e.g., completely received and stored) input data in the command lane 135 and the monitor lane 140 are different. For example, at the beginning of frame N+1, the most recent ready data of the command lane is input data 202 but the most recent ready data of the monitor lane 140 is input data 214. In response to the command lane 135 lagging the monitor lane 140, the coherency module 137 of the command lane 135 can select the last, or most recent, ready input data, which in this example is input data 202, stored in the buffer 138a. The selected input data 202 can be outputted to a transmission bus (e.g., a ARINC 429 transmission bus) for further processing (e.g., generation of signal 139).

In response to the command lane 135 lagging the monitor lane 140, the coherency module 142 of the monitor lane 140 can select a ready input data previous to the last, or most recent, ready input data, which in this example is input data 212, stored in the buffer 143a. Note that the valid input data previous to the most recent input data is selected in order to align with input data expected to be selected by the command lane 135 (the expectation being based on the comparison of the patterns 205 and 215, indicating a lag at the command lane 135). For example, due to the command lane 135 lagging the monitor lane 140, the monitor lane 140 can determine that the input data being received at frame N (e.g., 204) may not completely received at the start of frame N+1, thus not ready. Therefore, the monitor lane 140 can expect the command lane 135 to select the most recent valid input data received at the previous frame N-1 at the command lane 135 (e.g., input data 202). Based on this expectation, the monitor lane 140 can select the valid is data 212 that can align with the expected selection of is data 202 by the command lane 135. The selected is data 212 can be outputted to a transmission bus (e.g., a ARINC 429 transmission bus) for further processing (e.g., generation of signal 144). As such, the selected input data 202 and 212 outputted by the command lane 135 and monitor lane 140 can be used to generate identical outputs and in a synchronous manner.

Figure 3:
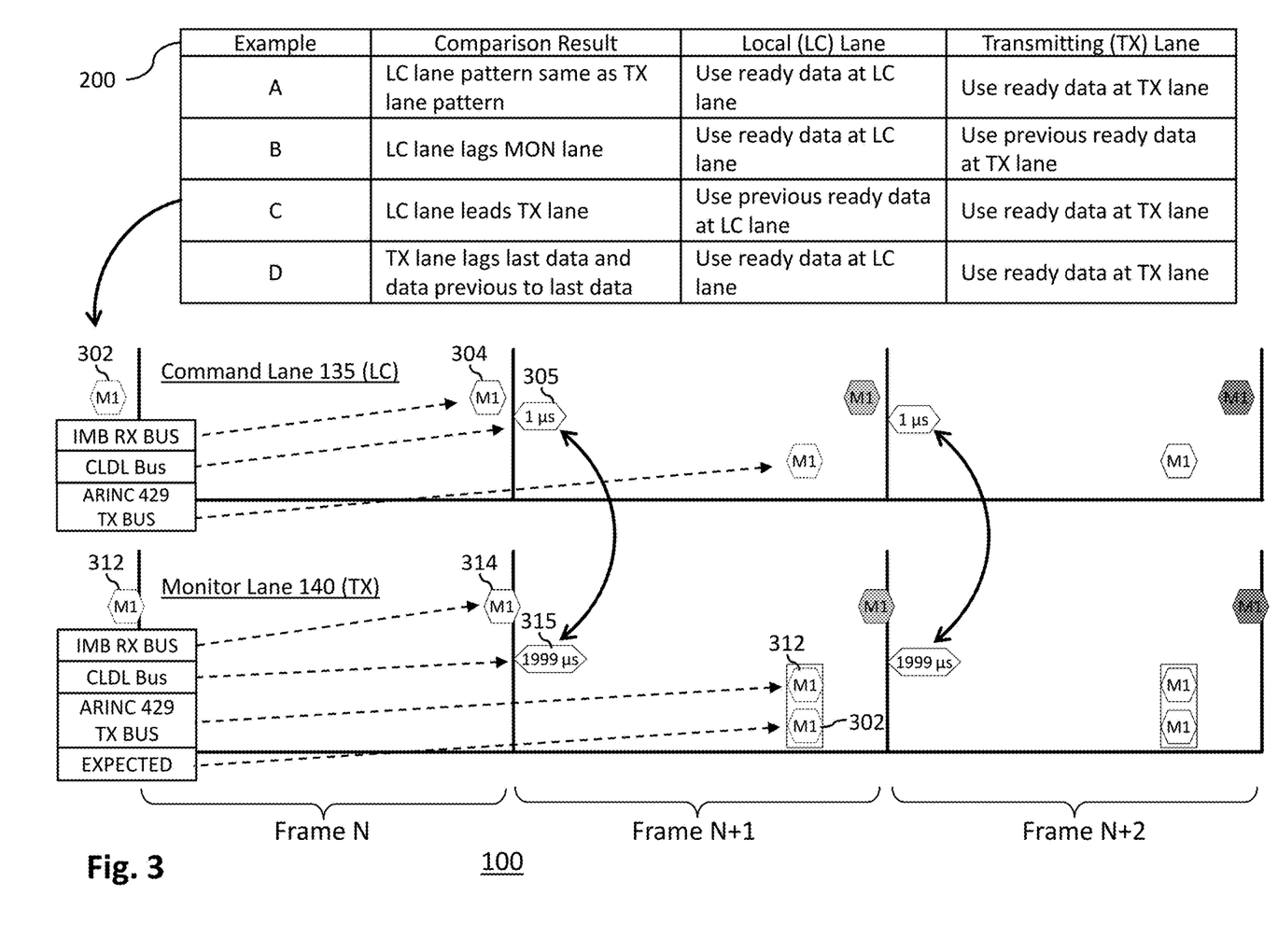
FIG. 3 illustrates an example implementation of the example system 100 of FIG. 1 relating to data-coherency algorithm to achieve bit-for-bit transmission, in one embodiment.

FIG. 3 illustrates an example implementation of the example system 100 of FIG. 1 relating to data-coherency algorithm to achieve bit-for-bit transmission, in one embodiment FIG. 3 may include components that are labeled identically to components of FIGS. 1-2, which are not described again for the purposes of clarity. The description of FIG. 3 may reference at least some of the components of FIGS. 1-2.

Focusing on example C of the table 200, assuming the command lane 135 is the local lane and the monitor lane 140 is the transmitting lane, a piece of input data 302 can be received by the command lane 135 at frame N-1 and input data 312 can be received by the monitor lane 140 at frame N-1. The command lane 135 can store the input data 302 in a buffer (e.g., buffer 138a) of command lane 135, and the monitor lane 140 can store the input data 312 in a buffer (e.g., buffer 143a) of monitor lane 140. The operations of the command lane 135 and the monitor lane 140 can proceed from frame N-1 to frame N. During frame N, another piece of input data 304 can be received by the command lane 135, and another piece of input data 314 can be received by the monitor lane 140. The command lane 135 can store the input data 304 in another buffer (e.g., buffer 138b) of command lane 135, and the monitor lane 140 can store the input data 314 in another buffer (e.g., buffer 143b) of monitor lane 140. Note that the input data 314 was not completely received by the monitor lane 140 during the transition from frame N to frame N+1 (e.g., the input data 314 overlaps with the line separating the two frames). Thus, at the beginning of frame N+1, the input data 314 may be deemed as not ready, while the input data 312 received at frame N-1 remains as a ready message or data. Similarly, input data 302 and 304 received by the command lane 135 are both ready when frame N+1 begins. The operations of the command lane 135 and the monitor lane 140 can proceed from frame N to frame N+1.

During frame N+1, the CLDL modules (e.g., CLDL modules 136, 141 in FIG. 1) of the command lane 135 and the monitor lane 140 can exchange patterns 305 and 315. The pattern 305 shown in FIG. 3 can represent a transmission time of the input data 304 from the FCC 110, such as, for example, the 1-µs mark in a 2-ms frame. Similarly, the pattern 315 shown in FIG. 3 can represent a transmission time of the input data 314, such as, for example, the 1999-µs mark in a 2-ms frame. A comparison of the pattern 305 and 315 performed by the coherency modules 137, 142 can indicate that the command lane 135 leads the monitor lane 140.

In response to the command lane 135 leading the monitor lane 140, the coherency module 137 of the command lane 135 can select a valid input data previous to the last, or most recent, valid input data, which in this example is input data 302, stored in the buffer 143a. Note that the valid input data previous to the most recent input data is selected in order to align with input data expected to be selected by the monitor lane 140. Since the command lane 135 leads the monitor lane 140, the command lane 135 can determine that the input data 314 is not completely received by the monitor lane 140 at a start of frame N+1, thus not ready. Therefore, the command lane 135 can expect the monitor lane 140 to select the most recent valid input data at the monitor lane 140, which is control data 312. Based on this expectation, the command lane 135 can select the valid input data 302 that can align with the expected selection of input data 312 by the monitor lane 140. The selected input data 302 can be outputted to a transmission bus (e.g., a ARINC 429 transmission bus) for further processing (e.g., generation of signal 139).

In response to the command lane 135 leading the monitor lane 140, the coherency module 142 of the monitor lane 140 can select the last, or most recent, valid input data, which in this example is control data 312, stored in the buffer 143a. The monitor lane 140 can expect the command lane 135 to select the input data previous to the most recent valid input data in command lane 135. Based on this expectation, the monitor lane 140 can select the valid input data 312 that can align with the expected selection of input data 302 by the command lane 135. The selected input data 312 can be outputted to a transmission bus (e.g., a ARINC 429 transmission bus) for further processing (e.g., generation of signal 144). As such, the selected control data 302 and 312 outputted by the command lane 135 and monitor lane 140 can be used to generate identical outputs and in a synchronous manner.

Focusing on example D of the table 200, assuming the command lane 135 is the local lane and the monitor lane 140 is the transmitting lane, if the comparison result indicates that the transmitting lane is lagging by two frames, the local lane and the transmitting lane can respectively select its own most recent ready input data. Note that this comparison result can be an implication that the system 100 may not look back to more than two frames of transmission to implement the selection described herein, and note that two buffers are being used to store the two most recent ready input data—which allows the system 100 to look back at most two frames. Thus, the number of frames to look back and the number of buffers to be used can be based on a desired implementation of the system 100. Further, such an embodiment allows the system 100 to reset at a next frame without suspending operations of the components of the system 100. For example, if the command lane 135 experiences a failure such that no new input data is received for two frames at N and N+1, and begins to function again at frame N+2, then at N+2 the two lanes can still perform their comparison functions based on data stored in respective pair of buffers and new data being received at frame N+2.

Figure 4:
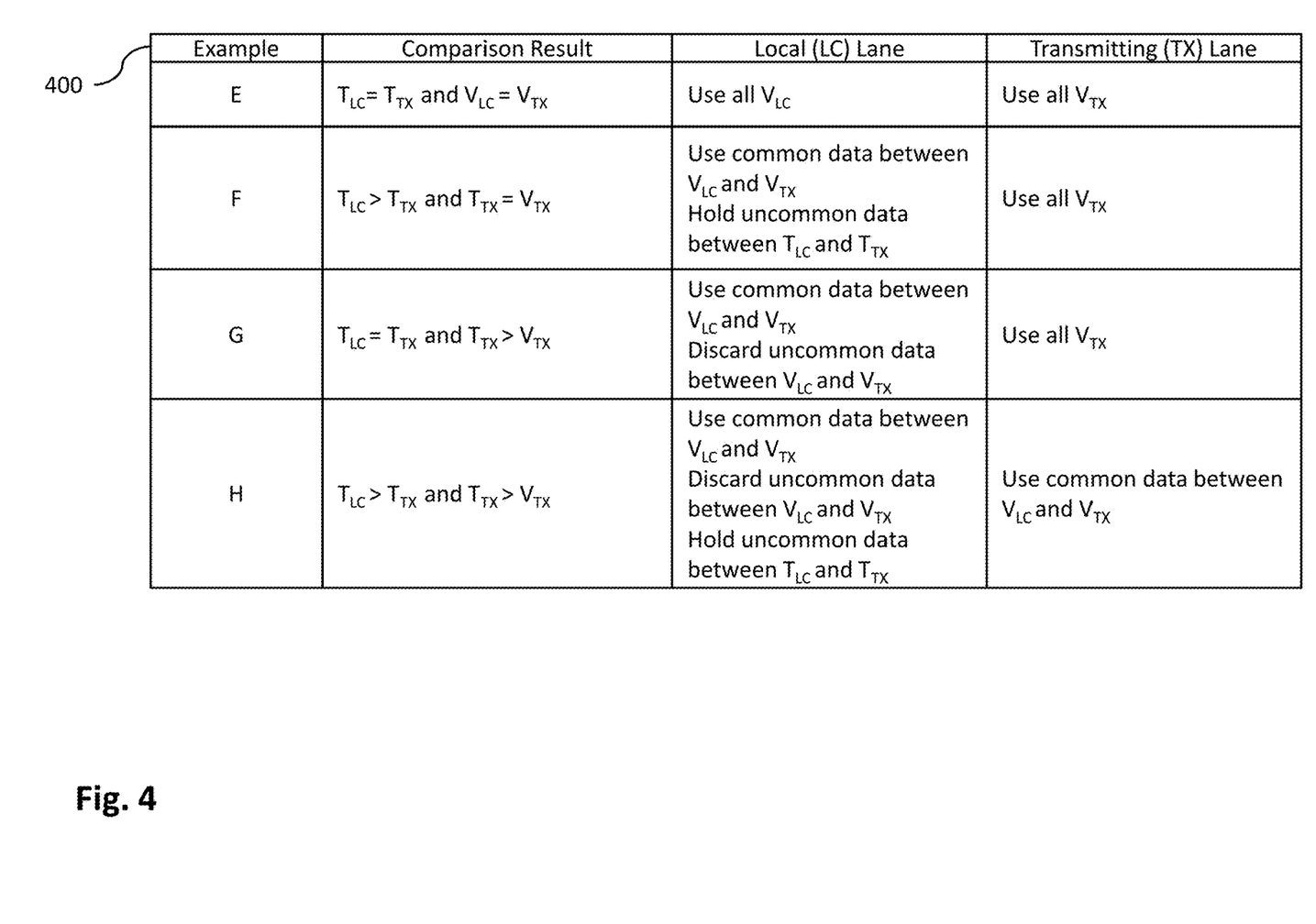
FIG. 4 illustrates a table showing example comparisons relating to data-coherency algorithm to achieve bit-for-bit transmission in one embodiment.

FIG. 4 illustrates a table showing example comparisons relating to data-coherency algorithm to achieve bit-for-bit transmission in one embodiment. FIG. 4 may include components that are labeled identically to components of FIGS. 1-3, which are not described again for the purposes of clarity. The description of FIG. 4 may reference at least some of the components of FIGS. 1-3.

In an example, a table 400 in FIG. 4 shows various comparison results and the selections made by a lane in response to different comparison results. The table 400 represents selections by a local (LC) lane and a transmitting (TX) lane, where the local lane represents a local or self perspective of one of the command lane 135 and the monitor lane 140. For example, when the command lane 135 is the local lane, the monitor lane 140 is the transmitting lane, and when the monitor lane 140 is the local lane, the command lane 135 is the transmitting lane. Note that the table 400 illustrates comparisons of activity patterns representing number of messages or label bits (or labels) among input data 112 (or a message in ARINC 429 format) being received at the ACE 130 from a LRU. In the table 400, $T_{LC}$ denotes a total number of label bits received by the local lane and $T_{TX}$ denotes a total number of label bits received by the transmitting lane. Further, $V_{LC}$ denotes a total number of valid label bits (e.g., label bits among $T_{LC}$ deemed valid, ready, or completely received by the local lane) received by the local lane, and $V_{TX}$ denotes a total number of valid label bits (e.g., label bits among $T_{TX}$ deemed valid, ready, or completely received by the transmitting lane) received by the transmitting lane.

Figure 5:
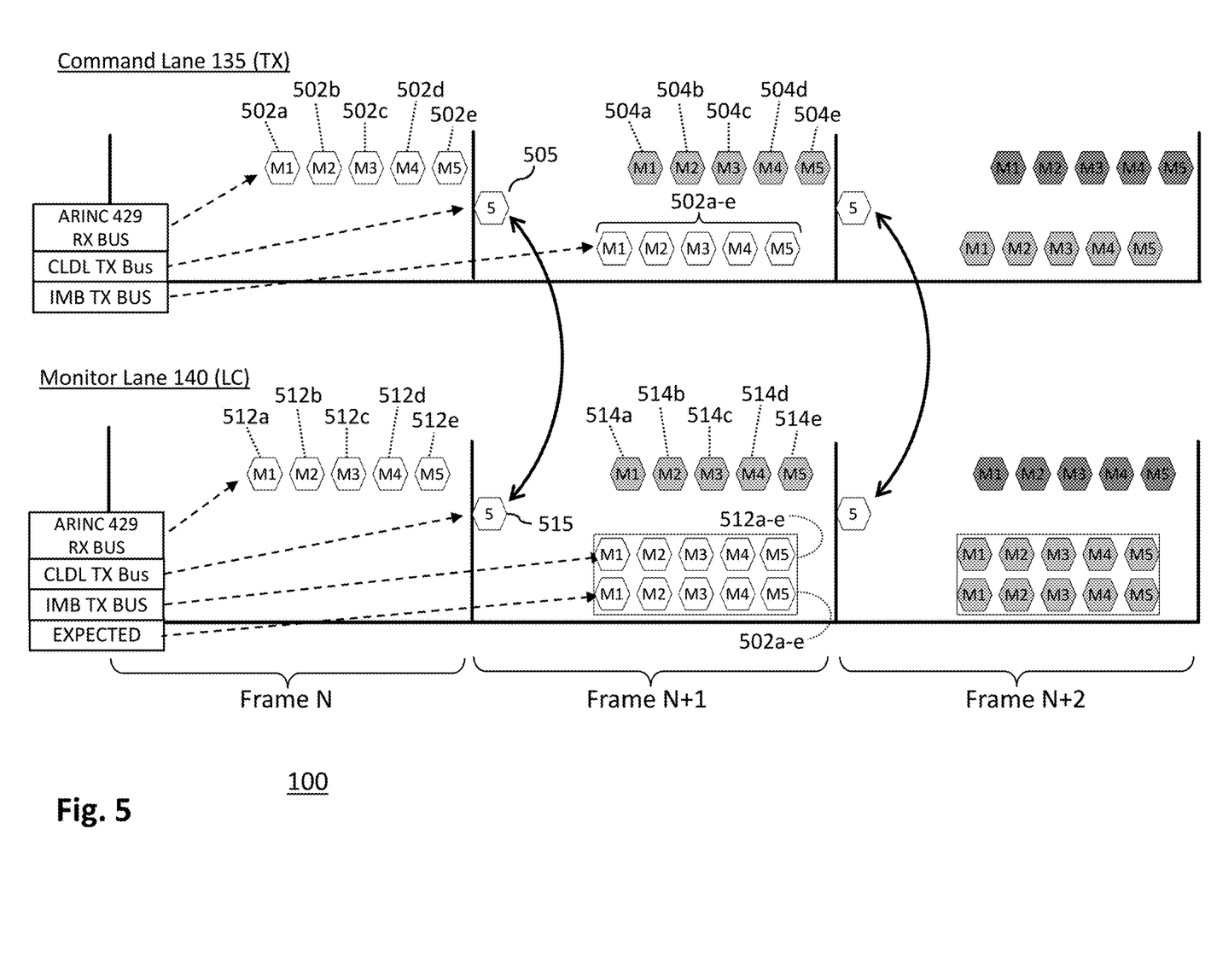
FIG. 5 illustrates an example implementation of the example system 100 of FIG. 1 relating to data-coherency algorithm to achieve bit-for-bit transmission, in one embodiment.
Figure 6:
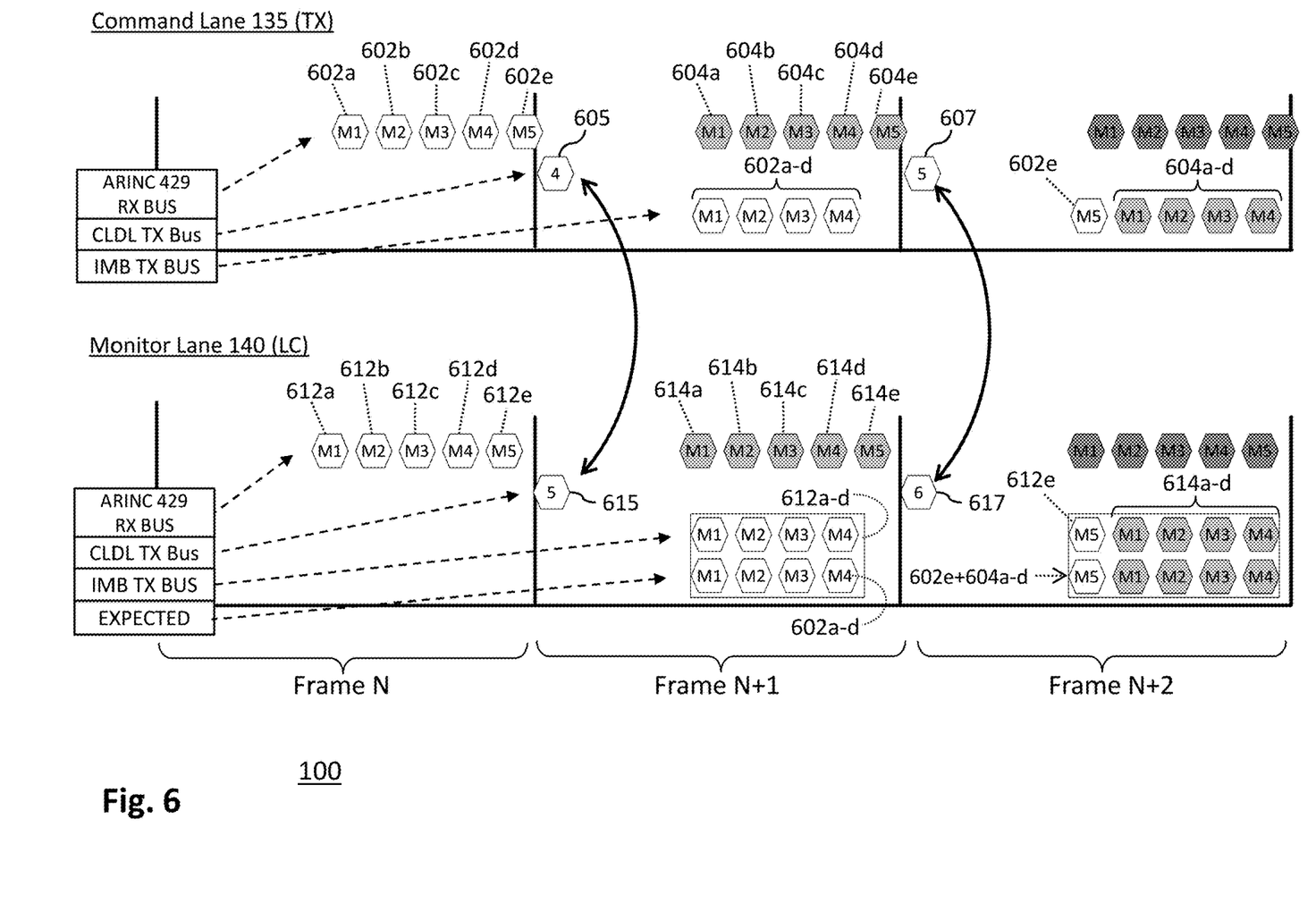
FIG. 6 illustrates an example implementation of the example system 100 of FIG. 1 relating to data-coherency algorithm to achieve bit-for-bit transmission, in one embodiment.

The comparison of received labels and/or valid labels between the command lane 135 and the monitor lane 140 can be used to determine whether one lane is lagging another lane. In an example, a bit length of labels in an ARINC 429 data packet is 8-bits. For example, since all data packets of the ARINC 429 data type can include 8 label bits, if a first lane received and validate all 8 label bits while a second lane received and validate 7 out of 8 label bits, then there is an indication that the second lane is lagging the first lane. Additional details of some of the examples shown in FIG. 4 will be described below and are depicted in FIGS. 5-6.

Focusing on example E shown in the table 400, a comparison between the number of labels received by the local and transmitting lanes, and the number of valid labels among both sets of received labels, indicates that the activity patterns of the both the local lane and transmitting lane are the same. The coherency modules (e.g., 137, 142 in FIG. 1) of the lanes can select valid labels among their respective received labels to be used in generation of the outputs such as the signals 139 and 144 shown in FIG. 1.

Focusing on example F shown in the table 400, a comparison between the number of labels received by the local and transmitting lanes indicates that the number of received labels at the local lane is greater than the number of received labels at the transmitting lane. Further, the transmitting lane can notify the local lane that the all the received labels at the transmitting lane are valid (e.g., $T_{TX}=V_{TX}$). The comparison result of example F can indicate that the local lane is leading the transmitting lane (or the transmitting lane is lagging the local lane). In response to the comparison result in example F, the local lane can select a set of agreed valid labels between the local lane and the transmitting lane—which can be labels that are common between $V_{LC}$ and $V_{TX}$, to be used in generation of outputs such as the signal 139 and the signal 144 shown in FIG. 1. In response to the comparison result in example F, the transmitting lane can select the valid labels among the received labels at the transmitting lane to be used in generation of outputs such as the signal 139 and the signal 144 shown in FIG. 1. Further, the local lane can hold, or store, common labels between $T_{LC}$ and $T_{TX}$, such as labels among the received labels $T_{LC}$ that are absent from the transmitting lane received labels $T_{TX}$. The labels being held can be compared with labels of the transmitting lane in a next frame.

Focusing on example G shown in the table 400, a comparison between the number of labels received by the local and transmitting lanes indicates that the number of received labels at the local lane is equal to the number of received labels at the transmitting lane. Further, the transmitting lane can notify the local lane that not all the received labels at the transmitting lane are valid (e.g., $T_{TX}>V_{TX}$). In response to the comparison result in example G, the local lane can select a set of agreed valid labels between the local lane and the transmitting lane—which can be labels that are common between $V_{LC}$ and $V_{TX}$, to be used in generation of outputs such as the signal 139 and the signal 144 shown in FIG. 1. In response to the comparison result in example G, the transmitting lane can select the valid labels among the received labels at the transmitting lane to be used in generation of outputs such as the signal 139 and the signal 144 shown in FIG. 1. Further, the local lane can discard uncommon labels between $V_{LC}$ and $V_{TX}$, such as labels that are present in $V_{LC}$ but absent from the valid labels $V_{TX}$. In some examples, the discarded labels can be labels deemed as invalid, by the transmitting lane, due to parity of other protocol error.

Focusing on example H shown in the table 400, a comparison between the number of labels received by the local and transmitting lanes indicates that the number of received labels at the local lane is greater than the number of received labels at the transmitting lane. Further, the transmitting lane can notify the local lane that not all the received labels at the transmitting lane are valid (e.g., $T_{TX}>V_{TX}$). The comparison result of example H can indicate that the local lane is leading the transmitting lane (or the transmitting lane is lagging the local lane). In response to the comparison result in example H, both the local lane and the transmitting lane can select a set of agreed valid labels between the local lane and the transmitting lane—which can be labels that are common between $V_{LC}$ and $V_{TX}$, to be used in generation of outputs such as the signal 139 and the signal 144 shown in FIG. 1. The local lane can also discard uncommon labels between $V_{LC}$ and $V_{TX}$, such as labels that are present in $V_{LC}$ but absent from the valid labels $V_{TX}$. In some examples, the discarded labels can be labels deemed as invalid, by the transmitting lane, due to parity of other protocol error. The local lane can also hold, or store, common labels between $T_{LC}$ and $T_{TX}$, such as labels among the received labels $T_{LC}$ that are absent from the transmitting lane received labels $T_{TX}$. The labels being held can be compared with labels of the transmitting lane in a next frame.

FIG. 5 illustrates an example implementation of the example system 100 of FIG. 1 relating to data-coherency algorithm to achieve bit-for-bit transmission, in one embodiment. FIG. 5 may include components that are labeled identically to components of FIGS. 1-4, which are not described again for the purposes of clarity. The description of FIG. 5 may reference at least some of the components of FIGS. 1-4.

FIG. 5 illustrates example E in table 400 shown in FIG. 4, where $T_{LC}=T_{TX}$ and $V_{LC}=V_{TX}$, the command lane 135 is the local lane, the monitor lane 140 is the transmitting lane, and the labels to be used in the comparison are 5-bit labels. A data packet (e.g., input data 112) including labels 502a, 502b, 502c, 502d, 502e, can be received by the command lane 135 at frame N. A data packet including labels 512a, 512b, 512c, 512d, 512e, can be received by the monitor lane 140 at frame N. The command lane 135 can store the labels 502a, 502b, 502c, 502d, 502e in a buffer (e.g., buffer 138a) of command lane 135, and the monitor lane 140 can store the labels 512a, 512b, 512c, 512d, 512e in a buffer (e.g., buffer 143a) of monitor lane 140. The labels 502a, 502b, 502c, 502d, 502e are deemed as valid because they are completely received by the command lane 135 before the frame N ends (e.g., note the label 502e does not overlap the line separating the two frames). Similarly, the labels 512a, 512b, 512c, 512d, 512e are deemed as valid because they are completely received by the monitor lane 140 before the frame N ends (e.g., note the label 502e does not overlap the line separating the two frames).

The operations of the command lane 135 and the monitor lane 140 can proceed from frame N to frame N+1. During frame N+1, the CLDL modules (e.g., CLDL modules 136, 141 in FIG. 1) of the command lane 135 and the monitor lane 140 can exchange patterns 505 and 515. The pattern 505 shown in FIG. 5 can represent a number of valid labels among the received labels 502a, 502b, 502c, 502d, 502e (e.g., 5 labels) that the command lane 135 is expected to output to the IMB TX Bus. The 5 labels included in the pattern 505 can indicate that the monitor lane 140 has validate 5 labels (e.g., $V_{TX}=5$). The pattern 515 shown in FIG. 5 can represent a number of valid labels among the received labels 512a, 512b, 512c, 512d, 512e (e.g., 5 labels) that the monitor lane 140 is expected to use for comparison with the labels 502a, 502b, 502c, 502d, 502e. The 5 labels included in the pattern 515 can indicate that the command lane 135 has validate 5 labels (e.g., $V_{LC}=5$). Since it is known that data packets being transmitted has 5-bit labels, the system 100 can determine that $T_{LC}=V_{LC}$, $T_{TX}=V_{TX}$, and thus $T_{LC}=T_{TX}$. A comparison of the pattern 505 and 515 performed by the coherency modules 137, 142 can indicate that $T_{LC}=T_{TX}$ and $V_{LC}=V_{TX}$. Note that even though as shown in FIG. 5, the command lane 135 is lagging the monitor lane 140 (e.g., the two lanes are not in phase), the patterns 505 and 515 indicate that both lanes have completely received all labels (all 5 bits) and completed validation of all labels as well.

In response to the command lane 135 and the monitor lane 140 being in phase, the coherency module 137 of the command lane 135 can select all received and valid labels 502a, 502b, 502c, 502d, 502e to be outputted to a transmission bus (e.g., the IMB TX bus) for further processing (e.g., generation of signal 139). Similarly, in response to the command lane 135 and the monitor lane 140 being in phase, the coherency module 142 of the monitor lane 140 can select all received and valid labels 512a, 512b, 512c, 512d, 512e to be outputted to a transmission bus (e.g., the IMB TX bus) for further processing (e.g., generation of signal 144). As such, the selected labels outputted by the command lane 135 and monitor lane 140 can be used to generate respective outputs in a synchronous manner.

In an example, if the label 502d received by the command lane 135 is deemed as invalid due to parity or protocol error, then the pattern 505 can be 4 (instead of 5), and the illustration in FIG. 5 can represent example G in table 400 of FIG. 4. In example G, $T_{LC}=T_{TX}$ but $T_{TX}>V_{TX}$. In response to the comparison result of example G, the coherency module 137 of the command lane 135 can select all valid labels 502a, 502b, 502c, 502e to be outputted to a transmission bus (e.g., the IMB TX bus) for further processing (e.g., generation of signal 139). Similarly, in response to the comparison result of example G, the coherency module 142 of the monitor lane 140 can select common labels among $V_{LC}$ and $V_{TX}$, such as valid labels 512a, 512b, 512c, 512e to be outputted to a transmission bus (e.g., the IMB TX bus) for further processing (e.g., generation of signal 144). The monitor lane 140 can further discard the uncommon label 512d regardless of whether 512d is a valid or invalid label as the command lane 135 already indicated that label 502d is invalid, and thus the monitor lane 140 shall not compare the label 512d with any other label, resulting in the discard of label 512d.

FIG. 6 illustrates an example implementation of the example system 100 of FIG. 1 relating to data-coherency algorithm to achieve bit-for-bit transmission, in one embodiment. FIG. 6 may include components that are labeled identically to components of FIGS. 1-5, which are not described again for the purposes of clarity. The description of FIG. 6 may reference at least some of the components of FIGS. 1-5.

FIG. 6 illustrates example F in table 400 shown in FIG. 4, where $T_{LC}>T_{TX}$ and $T_{TX}=V_{TX}$, the monitor lane 140 is the local lane, the command lane 135 is the transmitting lane, and the labels to be used in the comparison are 5-bit labels. A data pack including labels 602a, 602b, 602c, 602d, 602e, can be received by the command lane 135 at frame N. A data pack including labels 612a, 612b, 612c, 612d, 612e, can be received by the monitor lane 140 at frame N. The command lane 135 can store the labels 602a, 602b, 602c, 602d, 602e in a buffer (e.g., buffer 138a) of command lane 135, and the monitor lane 140 can store the labels 612a, 612b, 612c, 612d, 612e in a buffer (e.g., buffer 143a) of monitor lane 140. The labels 612a, 612b, 612c, 612d, 612e can be deemed as valid because they are completely received by the monitor lane 140 before the frame N ends. The labels 602a, 602b, 602c, 602d are deemed as valid because they are completely received by the command lane 135 before the frame N ends. However, the label 602e is not completely received by the command lane 135, and thus not validated (e.g., 602e is thus an invalid label). Therefore, $T_{LC}=5$ and $V_{LC}=5$ because the monitor lane 140 has 5 valid labels, $T_{TX}=4$ and $V_{TX}=4$ because only 4 labels were completely received by the command lane 135 in frame N.

Note that the command lane 135 and the monitor lane 140 can each perform an update to its own activity pattern in response to receiving new input data at the ACE 130. For example, upon the transition from frame N to N+1, the command lane 135 can set its pattern 605 to a value of "4", and upon the transition from frame N+1 to N+2, the command lane 135 can update pattern 605 to pattern 607 to indicate an updated pattern value of "5".

The operations of the command lane 135 and the monitor lane 140 can proceed from frame N to frame N+1. During frame N+1, the CLDL modules (e.g., CLDL modules 136, 141 in FIG. 1) of the command lane 135 and the monitor lane 140 can exchange patterns 605 and 615. The pattern 605 shown in FIG. 6 can represent a number of valid labels among the received labels 602a, 602b, 602c, 602d (e.g., 4 labels) that the command lane 135 is expected to output to the IMB TX Bus. The 4 labels included in the pattern 605 can indicate that the command lane 135 has validate 4 labels (e.g., $V_{TX}$=4). The pattern 615 shown in FIG. 6 can represent a number of valid labels among the received labels 612a, 612b, 612c, 612d, 612e (e.g., 5 labels) that the monitor lane 140 is expected to use for comparison with the labels outputted by the command lane 135. The 5 labels included in the pattern 615 can indicate that the monitor lane 140 has validate 5 labels (e.g., $V_{LC}$=5). Since it is known that data packets being transmitted has 5-bit labels, the system 100 can determine that $T_{LC}$>$T_{TX}$ and $T_{TX}$=$V_{TX}$. In response to the comparison result of example F, the coherency module 137 of the monitor lane 140 can select common data or labels between $V_{LC}$ and $V_{TX}$. For example, as shown in FIG. 6, the monitor lane 140 can select the labels 612a, 612b, 612c, 612d as they are common labels with 602a, 602b, 602c, 602d validated by the command lane 135. Further, the monitor lane 140 can hold or store uncommon labels between $T_{LC}$ and $T_{TX}$, such as the label 612e, for comparison in a next frame.

During frame N+1, a data pack including labels 604a, 604b, 604c, 604d, 604e, can be received by the command lane 135, and a data pack including labels 614a, 614b, 614c, 614d, 614e, can be received by the monitor lane 140. The command lane 135 can store the labels 604a, 604b, 604c, 604d, 604e in a buffer (e.g., buffer 138b) of command lane 135, and the monitor lane 140 can store the labels 614a, 614b, 614c, 614d, 614e in a buffer (e.g., buffer 143b) of monitor lane 140. The labels 614a, 614b, 614c, 614d, 614e can be deemed as valid because they are completely received by the monitor lane 140 before the frame N+1 ends. The labels 604a, 604b, 604c, 604d, are deemed as valid because they are completely received by the command lane 135 before the frame N+1 ends. However, the label 604e is not completely received by the command lane 135, and thus not validated (e.g., 604e is thus an invalid label). Therefore, in frame N+1, $T_{LC}$=6 and $V_{LC}$=6 because the monitor lane 140 has 5 valid labels 614a, 614b, 614c, 614d, 614e and also the valid label 612e that was held at frame N. Further, $T_{TX}$=5 and $V_{TX}$=5 because the command lane 135 has the 4 valid labels 604a, 604b, 604c, 604d, plus the label 602e from frame N is now validated at frame N+1.

The operations of the command lane 135 and the monitor lane 140 can proceed from frame N+1 to frame N+2. During frame N+2, the CLDL modules (e.g., CLDL modules 136, 141 in FIG. 1) of the command lane 135 and the monitor lane 140 can exchange patterns 607 and 617. The pattern 607 shown in FIG. 6 can represent a number of valid labels 602a, 602b, 602c, 602d, plus the remaining valid label 602e from previous frame N, (e.g., total 5 labels) that the command lane 135 is expected to output to the IMB TX Bus (e.g., $V_{TX}$=5). The pattern 615 shown in FIG. 6 can represent a number of valid labels 612a, 612b, 612c, 612d, 612e, plus the valid label 612e held from previous frame N, (e.g., total 6 labels) that the monitor lane 140 is expected to use for comparison with the labels outputted by the command lane 135 (e.g., $V_{LC}$=6). In response to the comparison result of example F, the coherency module 137 of the monitor lane 140 can select common data or labels between $V_{LC}$ and $V_{TX}$, such as the labels 612e, 614a, 614b, 614c, 614d as they are common labels with 602e, 604a, 604b, 604c, 604d outputted by the command lane 135. Further, the monitor lane 140 can hold or store uncommon labels between $T_{LC}$ and $T_{TX}$, such as the label 614e, for comparison in a next frame.

In an example, if the label 602d received by the command lane 135 is deemed as invalid due to parity or protocol error, then the pattern 605 can be 3 (instead of 4), and the illustration in FIG. 6 can represent example H in table 400 of FIG. 4. In example H, $T_{LC}$>$T_{TX}$ but $T_{TX}$>$V_{TX}$. In response to the comparison result of example H, the coherency module 137 of the command lane 135 can select all valid labels 602a, 602b, 602c, to be outputted to a transmission bus (e.g., the IMB TX bus) for further processing (e.g., generation of signal 139). Similarly, in response to the comparison result of example H, the coherency module 142 of the monitor lane 140 can select common labels among $V_{LC}$ and $V_{TX}$, such as valid labels 612a, 612b, 612c, to be outputted to a transmission bus (e.g., the IMB TX bus) for further processing (e.g., generation of signal 144). The monitor lane 140 can further discard the uncommon label 612d regardless of whether 612d is a valid or invalid label as the command lane 135 already indicated that label 602d is invalid, and thus the monitor lane 140 shall not compare the label 612d with any other label, resulting in the discard of label 612d. Further, the monitor lane 140 can hold or store uncommon labels between $T_{LC}$ and $T_{TX}$, such as the label 614e, for comparison in a next frame.

Figure 7:
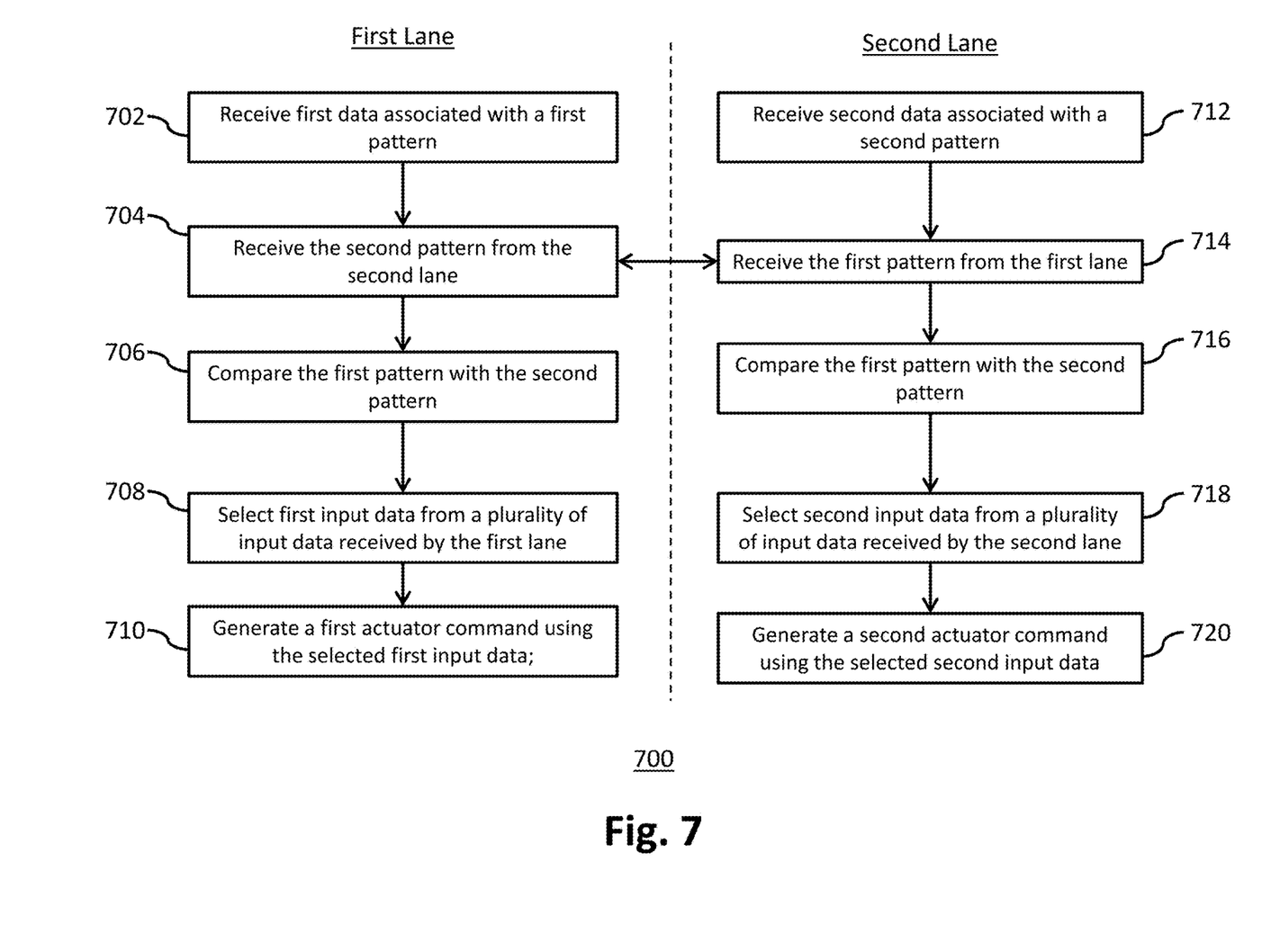
FIG. 7 is a flow diagram illustrating a process that can be performed by a processor to implement data-coherency algorithm to achieve bit-for-bit transmission in one embodiment.

FIG. 7 is a flow diagram illustrating a process 700 that can be performed by a processor to implement data-coherency algorithm to achieve bit-for-bit transmission in one embodiment. An example process may include one or more operations, actions, or functions as illustrated by one or more of blocks 702, 704, 706, 708, 710, 712, 714, 716, 718, and/or 720. Although illustrated as discrete blocks, various blocks may be divided into additional blocks, combined into fewer blocks, eliminated, or performed in parallel, depending on the desired implementation.

In an example, the blocks 702, 704, 706, 708, 710 can be performed by a first lane (e.g., command lane 135) of an actuator control electronics (ACE) device (e.g., ACE device 130), and blocks 712, 714, 716, 718, 720 can be performed by a second lane (e.g., monitor lane 140) of the actuator control electronics (ACE) device. The process 700 can begin at blocks 702 and/or 712. At block 702, the first lane can receive first data associated with a first pattern. At block 712, the second lane can receive second data associated with a second pattern. The process 700 can proceed from block 702 to block 704, and from block 712 to 714. At blocks 704 and 714, the first lane and the second lane can exchange the first and second patterns, such that the first lane can receive the second pattern from the second lane, and the second lane can receive the first pattern from the first lane.

The process 700 can proceed from block 704 to block 706, and from block 714 to 716. At block 706, the first lane can compare the first pattern with the second pattern. At block 716, the second lane can compare the first pattern with the second pattern. The process 700 can proceed from block 706 to block 708, and from block 716 to 718. At block 708, the first lane can select, based on a result of the comparison performed by the first lane at block 706, first input data from a plurality of input data that was received by the first lane.

At block 718, the second lane can select, based on a result of the comparison performed by the second lane at block 716, second input data from a plurality of input data that was received by the second lane. The process 700 can proceed from block 708 to block 710, and from block 718 to 720. At block 710, the first lane can generate a first actuator command using the first input data. At block 720, the second lane can generate a second actuator command using the second input data. The first actuator command generated by the first lane and the second actuator command generated by the second can be bit-for-bit identical.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A system comprising:
   a first lane of an actuator control electronics (ACE) device;
   a second lane of the ACE device configured to be in communication with the first lane of the ACE device;
   the first lane of the ACE device is operable to:
      receive first data associated with a first pattern;
      receive, from the second lane, a second pattern associated with second data received at the second lane;
      compare the first pattern with the second pattern; and
      select, based on the comparison, first input data from a plurality of input data received by the first lane; and
      generate a first actuator command using the selected first input data;
   the second lane of the ACE device is operable to:
      receive the second data;
      receive the first pattern from the first lane;
      compare the first pattern with the second pattern;
      select, based on the comparison, second input data from a plurality of input data received by the second lane; and
      generate a second actuator command using the selected second input data, wherein the first actuator command and the second actuator command are bit-for-bit identical.

2. The system of claim 1, wherein the first pattern includes a first timestamp indicating a first transmission time of the first data to the first lane, the second pattern includes a second timestamp indicating a second transmission time of the second data to the second lane, and the comparison of the first pattern with the second pattern includes a comparison of the first timestamp with the second timestamp.

3. The system of claim 2, wherein in response to a result of the comparison of the first timestamp and the second timestamp indicating the first lane and the second lane are in phase:
   the first input data selected by the first lane is received by the first lane at a current frame; and
   the second input data selected by the second lane is received by the second lane at the current frame.

4. The system of claim 2, wherein the first data is received by the first lane in a current frame, and the second data is received by the second lane in the current frame, and in response to a result of the comparison of the first timestamp and the second timestamp indicating the first lane and the second lane are out of phase:
   the first input data selected by the first lane is received by the first lane at a frame previous to the current frame; and
   the second input data selected by the second lane is received by the second lane at the frame previous to the current frame.

5. The system of claim 1, wherein:
   the first data includes a first number of labels;
   the first pattern indicates a second number of valid labels among the first number of labels;
   the second data includes a third number of labels; and
   the second pattern indicates a fourth number of valid labels among the third number of labels.

6. The system of claim 5, wherein in response to the first number being equal to the third number and the second number being equal to the fourth number:
   the first input data selected by the first lane comprises the second number of valid labels from the first data; and
   the second input data selected by the second lane comprises the fourth number of valid labels from the second data.

7. The system of claim 5, wherein in response to the first number being greater than the third number and the third number being equal to the fourth number:
   the first input data selected by the first lane comprises common valid labels between the second number of valid labels and the fourth number of valid labels;
   the first lane is operable to hold uncommon labels between the first number of labels and the third number of labels; and
   the second input data selected by the second lane comprises the fourth number of valid labels from the second data.

8. The system of claim 5, wherein in response to the first number being equal to the third number and the third number being greater than the fourth number:
   the first input data selected by the first lane comprises the second number of valid labels and the fourth number of valid labels from the first data;
   the first lane is operable to discard uncommon labels between the second number of valid labels and the fourth number of valid labels; and
   the second input data selected by the second lane comprises the fourth number of valid labels from the second data.

9. The system of claim 5, wherein in response to the first number being greater than the third number and the third number being greater than the fourth number:

the first input data selected by the first lane comprises common valid labels between the second number of valid labels and the fourth number of valid labels from the first data;
the first lane is operable to:
hold uncommon labels between the first number of labels and the third number of labels;
discard uncommon labels between the second number of valid labels and the fourth number of valid labels; and
the second input data selected by the second lane comprises common valid labels between the second number of valid labels and the fourth number of valid labels from the second data.

10. A method implemented by an actuator control electronics (ACE) device comprising a first lane and a second lane, the method comprising:
receiving, by the first lane, first data associated with a first pattern;
receiving, by the second lane, second data associated with a second pattern;
receiving, by the first lane, the second pattern from the second lane;
receiving, by the second lane, the first pattern from the first lane;
comparing, by the first lane, the first pattern with the second pattern;
comparing, by the second lane, the first pattern with the second pattern;
based on a result of the comparing:
selecting, by the first lane, first input data from a plurality of input data received by the first lane;
generating, by the first lane of the ACE device, a first actuator command using the selected first input data;
selecting, by the second lane, second input data from a plurality of input data received by the second lane; and
generating, by the second lane of the ACE device, a second actuator command using the selected second input data, wherein the first actuator command and the second actuator command are bit-for-bit identical.

11. The method of claim 10, wherein the first pattern includes a first timestamp indicating a first transmission time of the first data to the first lane, the second pattern includes a second timestamp indicating a second transmission time of the second data to the second lane, and the comparison of the first pattern with the second pattern includes a comparison of the first timestamp with the second timestamp.

12. The method of claim 11, wherein in response to a result of the comparison of the first timestamp and the second timestamp indicating the first lane and the second lane are in phase:
selecting the first input data comprises selecting input data received by the first lane at a current frame; and
selecting the second input data comprises selecting input data received by the second lane at the current frame.

13. The method of claim 11, wherein the first data is received by the first lane in a current frame, and the second data is received by the second lane in the current frame, and in response to a result of the comparison of the first timestamp and the second timestamp indicating the first lane and the second lane are out of phase:
selecting the first input data comprises selecting input data received by the first lane at a frame previous to the current frame; and
selecting the second input data comprises selecting input data received by the second lane at the frame previous to the current frame.

14. The method of claim 10, wherein:
the first data includes a first number of labels;
the first pattern indicates a second number of valid labels among the first number of labels;
the second data includes a third number of labels; and
the second pattern indicates a fourth number of valid labels among the third number of labels.

15. The method of claim 14, wherein in response to the first number being equal to the third number and the second number being equal to the fourth number:
selecting the first input data comprises selecting the second number of valid labels from the first data; and
selecting the second input data comprises selecting the fourth number of valid labels from the second data.

16. The method of claim 14, wherein in response to the first number being greater than the third number and the third number being equal to the fourth number:
selecting the first input data comprises selecting common valid labels between the second number of valid labels and the fourth number of valid labels;
holding, by the first lane, uncommon labels between the first number of labels and the third number of labels; and
selecting the second input data comprises selecting the fourth number of valid labels from the second data.

17. The method of claim 14, wherein in response to the first number being equal to the third number and the third number being greater than the fourth number, the method comprising:
selecting the second input data comprises selecting input data the second number of valid labels and the fourth number of valid labels from the first data;
discarding, by the first lane, uncommon labels between the second number of valid labels and the fourth number of valid labels; and
selecting the second input data comprises selecting input data the fourth number of valid labels from the second data.

18. The method of claim 14, wherein in response to the first number being greater than the third number and the third number being greater than the fourth number, the method comprising:
selecting the second input data comprises selecting input data common valid labels between the second number of valid labels and the fourth number of valid labels from the first data;
holding, by the first lane, uncommon labels between the first number of labels and the third number of labels;
discarding, by the first lane, uncommon labels between the second number of valid labels and the fourth number of valid labels; and
selecting the second input data comprises selecting input data common valid labels between the second number of valid labels and the fourth number of valid labels from the second data.

19. A flight control system comprising:
a processor configured to receive input data;
an actuator control electronics (ACE) device configured to be in communication with the processor, the ACE device comprises a first lane and a second lane;
a remote electronic unit (REU) configured to be in communication with the ACE device; and
an actuator configured to be in communication with the REU;

the first lane of the ACE device is operable to:
- receive, from the processor, first data associated with a first pattern, wherein the first data is a first copy of the input data;
- receive, from the second lane, a second pattern associated with second data received at the second lane;
- compare the first pattern with the second pattern; and
- select, based on the comparison, first input data from a plurality of input data received by the first lane;
- generate a first actuator command using the selected first input data; and
- send the first actuator command to the REU;

the second lane is operable to:
- receive, from the processor, the second data, wherein the second data is a second copy of the input data;
- receive the first pattern from the first lane;
- compare the first pattern with the second pattern;
- select, based on the comparison, second input data from a plurality of input data received by the second lane;
- generate a second actuator command using the selected second input data, wherein the first actuator command and the second actuator command are bit-for-bit identical; and
- send the second actuator command to the REU;

the REU is operable to control the actuator using one of the first actuator command and the second actuator command.

20. The system of claim 19, wherein the comparison of the first pattern and the second pattern indicates whether the first lane and the second lane are in phase or out of phase.

* * * * *